US012743507B2

(12) United States Patent
Datta et al.

(10) Patent No.: US 12,743,507 B2
(45) Date of Patent: Sep. 22, 2026

(54) DETECTING AND PREVENTING FREQUENCY ATTACKS

(71) Applicant: NVIDIA Corporation, Santa Clara, CA (US)

(72) Inventors: Biswajit Datta, Fremont, CA (US); Rohitkumar Makhija, Milpitas, CA (US); William Ryan Weese, Portland, OR (US); Raghu Krishnamurthy, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 20 days.

(21) Appl. No.: 18/898,100

(22) Filed: Sep. 26, 2024

(65) Prior Publication Data

US 2026/0087130 A1 Mar. 26, 2026

(51) Int. Cl.

| | |
|---|---|
| ***G06F 21/55*** | (2013.01) |
| ***G06F 13/42*** | (2006.01) |
| ***G06F 21/54*** | (2013.01) |
| ***G06F 21/57*** | (2013.01) |
| ***G06F 21/71*** | (2013.01) |

(52) U.S. Cl.
CPC ........ *G06F 21/554* (2013.01); *G06F 13/4291* (2013.01); *G06F 21/54* (2013.01); *G06F 21/556* (2013.01); *G06F 21/57* (2013.01); *G06F 21/71* (2013.01)

(58) Field of Classification Search
CPC ...... G06F 21/554; G06F 21/54; G06F 21/556; G06F 21/57; G06F 21/71
See application file for complete search history.

(56) References Cited

U.S. PATENT DOCUMENTS

| | | | | |
|---|---|---|---|---|
| 3,706,982 A * | 12/1972 | Gehman | G08B 13/26 | 340/539.1 |
| 6,522,989 B1 * | 2/2003 | Gover | G06F 30/3312 | 716/108 |
| 11,183,244 B2 * | 11/2021 | Huang | G11C 16/26 | |
| 2006/0193195 A1 * | 8/2006 | Hur | G11C 7/1072 | 365/189.08 |
| 2013/0275636 A1 * | 10/2013 | Decesaris | G06F 13/4291 | 710/110 |
| 2014/0035560 A1 * | 2/2014 | Olmos | G06F 1/14 | 324/76.41 |

(Continued)

OTHER PUBLICATIONS

Kim et al., "Analysis of Effect of Spoofing Signal in GPS Rec", Oct. 17, 2012, IEEE Explore, 2012 12th International Conference on Control, Automation and Systems (Year: 2012).*

(Continued)

*Primary Examiner* — Ramy M Osman
(74) *Attorney, Agent, or Firm* — Davis Wright Tremaine LLP

(57) ABSTRACT

Apparatuses, systems, and techniques to monitor a frequency of a clock signal sent to a device to prevent or limit undesired access to the device. In at least one embodiment, a frequency monitor circuit detects a selection signal sent to a device and monitors a frequency of a clock signal also sent to the device. In at least one embodiment, if the frequency of the clock signal exceeds a predetermined threshold, the frequency monitor circuit may assert a control signal to initiate an action to prevent or limit undesired access to the device.

25 Claims, 9 Drawing Sheets

(56) References Cited

U.S. PATENT DOCUMENTS

| | | | | |
|---|---|---|---|---|
| 2017/0185345 | A1* | 6/2017 | Lim | G06F 12/1441 |
| 2019/0172047 | A1* | 6/2019 | Tan | H04W 4/80 |
| 2022/0066881 | A1* | 3/2022 | Jeon | G06F 11/0742 |
| 2023/0013452 | A1* | 1/2023 | Alam | G08G 1/0129 |
| 2023/0025053 | A1* | 1/2023 | Cho | G06F 21/575 |
| 2023/0259661 | A1* | 8/2023 | Bhagwat | G06F 21/71 726/25 |
| 2024/0080670 | A1* | 3/2024 | Reimann | H04W 12/128 |
| 2025/0190596 | A1* | 6/2025 | Rajgor | G06F 21/74 |
| 2025/0258908 | A1* | 8/2025 | Rajgor | G06F 21/54 |
| 2026/0087130 | A1* | 3/2026 | Datta | G06F 21/554 |

OTHER PUBLICATIONS

Jha, Asmita, "IoT Security—Part 15 (101—Hardware Attack Surface : SPI)", Sep. 26, 2020, https://payatu.com/blog/hardware-attack-surface-spi/ (Year: 2020).*

Buhren, et al., "One Glitch to Rule Them All: Fault Injection Attacks against AMD's Secure Processor", 2021, BlackHat Europe 2021, https://i.blackhat.com/EU-21/Wednesday/EU-21-Buhren-One-Glitch-to-Rule-them-All-Fault-Injection-Attacks-Against-AMDs-Secure-Processor.pdf (Year: 2021).*

Microchip, "CEC1736," Retrieved from, https://www.microchip.com/en-us/product/cec1736, 2024, 5 Pages.

Opentitan, "Flash Controller HWIP Technical Specification," Retrieved from, https://opentitan.org/book/hw/ip/flash_ctrl/index.html, 2023, 10 Pages.

* cited by examiner

DETECTING AND PREVENTING FREQUENCY ATTACKS

TECHNICAL FIELD

At least one embodiment pertains to securing a device or system by monitoring a frequency of a clock signal. In at least one embodiment, one or more circuits monitor a frequency of a clock signal and detect when the frequency exceeds a high threshold and/or fails to exceed a low threshold, which indicates a potential threat to operation of at least one component (e.g., firmware, memory, a peripheral device, etc.) of a device or system (e.g., a data center). In at least one embodiment, the one or more circuits may intervene to avert the potential threat.

BACKGROUND

A potential attacker that gains control of an application processor (AP) may potentially drive an interface clock signal sent by the AP to another component faster than security circuitry can monitor communications sent by the AP, such as memory access requests, and thus evade security protection provided by the security circuitry. A successful attack on the interface circuitry could potentially create a denial of service (DoS), a permanent denial of service (PDoS), or other security risk.

DETAILED DESCRIPTION

Figure 1:
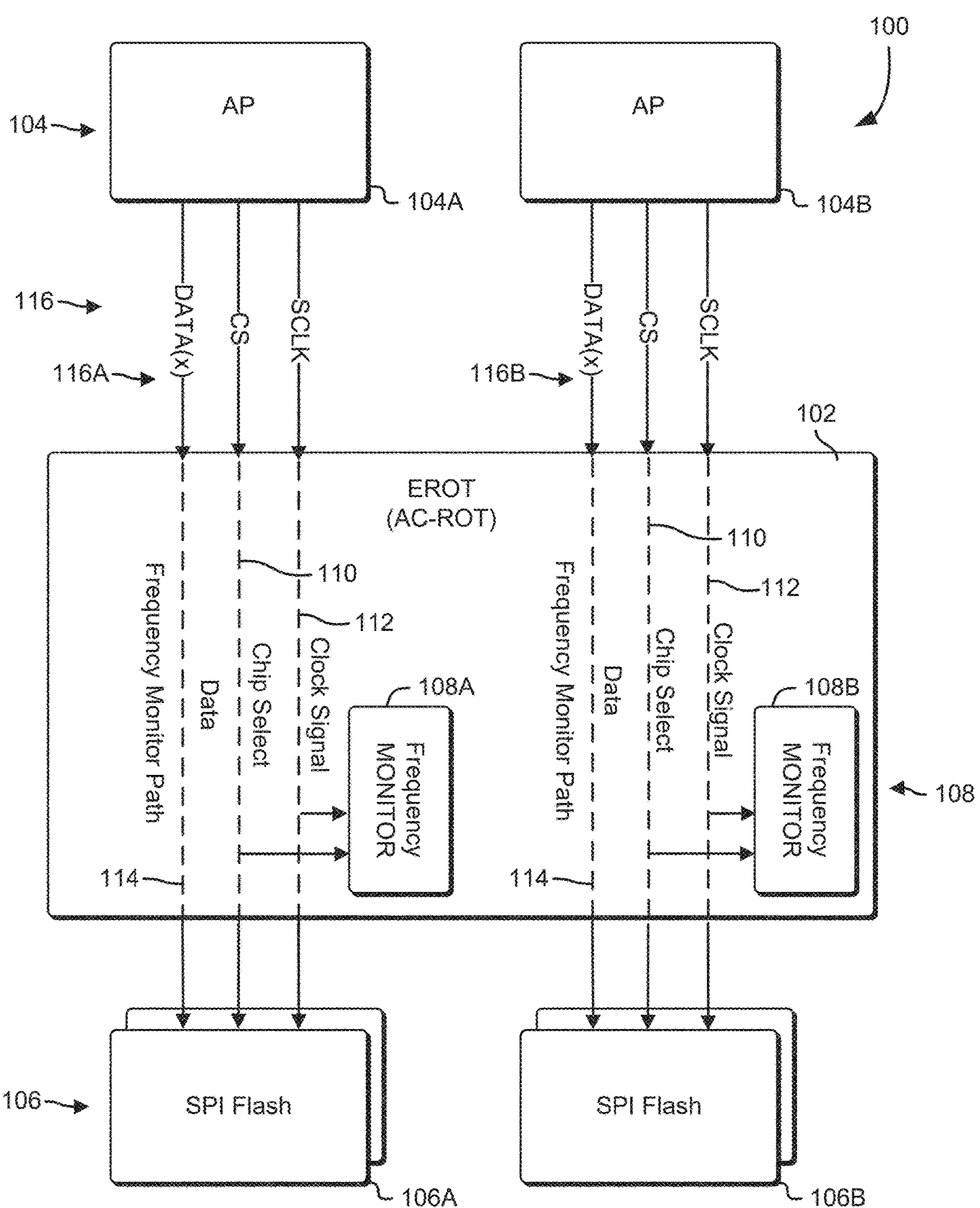
FIG. 1 is a functional block diagram illustrating an example system, in accordance with at least one embodiment.

FIG. 1 is a functional block diagram illustrating an example system 100, in accordance with at least one embodiment. In at least one embodiment, the system 100 is a component of one or more devices within a data center (e.g., a data center 700 of FIG. 7), such as a server, a router, a gateway, another network device, and/or the like. In at least one embodiment, the system 100 is a component of a computing system, such as a laptop, a personal computer, another computing device, a plurality of computing devices connected together by a network, and/or the like. In at least one embodiment, the system 100 is a component of an agent, such as a robot, autonomous vehicle, a semi-autonomous vehicle, and/or the like. In at least one embodiment, the system 100 is a component of a mobile device, such as a cellular telephone, a tablet computing device, and/or the like. In at least one embodiment, the system 100 is a component of an Internet of Things (IoT) device, such as a home appliance (e.g., an oven, a microwave, a refrigerator, a dishwasher, a thermostat, a coffee maker, a television, a toaster, etc.), an industrial sensor, a medical device, and/or the like. In at least one embodiment, the system 100 is a component of an edge device of a network, such as a router, a switch, a firewall, an IoT gateway, an edge server, a sensor (e.g., a camera, a LiDAR device, a microphone, a temperature sensor, a motion sensor, a gas sensor, a humidity sensor, a pressure sensor, a proximity sensor, an infrared sensor, a level sensor, an electric current sensor, a voltage sensor, a flow sensor, a light sensor, a radiation sensor, an accelerometer, a speedometer, etc.), and/or the like. In at least one embodiment, the system 100 is a component of a Global Positioning System (GPS) device, and/or a network interface (e.g., a network interface controller, a network interface card, and/or the like).

The system 100 includes one or more security components 102, one or more application processors (AP(s)) 104, and one or more frequency monitors 108 that each detects when a clock signal sent by at least one of the AP(s) 104 exceeds a high threshold frequency and/or falls below a low threshold frequency. In the example illustrated in FIG. 1, the frequency monitor(s) 108 include frequency monitors 108A and 108B. However, the system 100 is not limited to a particular number of frequency monitors and, in at least one embodiment, the system 100 may include a single frequency monitor or more than two frequency monitors.

The security component(s) 102 may implement, at least in part, a Root of Trust (ROT), such as an External Root of Trust (EROT), an Integrated Root of Trust (IROT), and/or the like. The security component(s) 102 is/are positioned between the AP(s) 104 and at least one other component of the system 100 along one or more communication channels 116. The other component(s) may include one or more memory devices 106 (e.g., one or more Flash memory chips, one or more hard drives, and/or the like), one or more peripheral devices (e.g., a keyboard, a mouse, a monitor, a touch screen, a printer, a sensor, a camera, a microphone, a track pad, a game controller, an extended reality ("XR") device, a virtual reality (VR) device, an augmented reality (AR) device, a mixed reality (MR) device, a biometric data collection device (e.g., a fingerprint detection device), etc.), one or more network interfaces, and/or the like. For example, the security component(s) 102 may be positioned between the AP(s) 104 and firmware (FW) of the AP(s) 104, which may typically be stored on the memory device(s) 106 (e.g., one or more Flash memory chips) and is accessed by the AP(s) 104 using the communication channel(s) 116. In FIG. 1, the system 100 is depicted as including memory devices 106A and 106B that store FW accessed by APs 104A and 104B, respectively. However, the security component(s) 102 may be used with respect to any number of APs, including a single AP, any number of memory devices, including a single memory device. The security component(s) 102 may verify authenticity of the FW and/or software to help ensure that only authorized code is executed by the AP(s) 104. In at least one embodiment, the security component(s) 102 (e.g., EROT) provides a secure flash and boot mechanism, ensuring that the FW and/or system boot process are protected from tampering and/or unauthorized access. The security component(s) 102 (e.g., EROT) may ensure that a hypervisor and/or other software to be performed by the AP(s) 104 is securely booted and/or has not been tampered with. In at least one embodiment, the memory devices 106A and 106B may store the FW and/or software that is to be used by the AP(s) 104 to perform one or more boot operations, to perform one or more device configuration operations, and/or to log data.

In at least one embodiment, the AP(s) 104 may include one or more central processing units (CPU(s)), one or more graphics processing units (GPU(s)), one or more parallel processing units (PPU(s)), one or more accelerators, one or more microprocessors, one or more microcontrollers, one or more controllers, one or more digital signal processors, one or more data processing units (DPU(s)), one or more other types of processors, one or more virtual machines (e.g., managed by a hypervisor), one or more remote processing units connected to the communication channel(s) 116 (e.g., by one or more networks and one or more network interfaces), one or more other types of devices (e.g., one or more communication devices and/or interfaces), two or more heterogenous processing devices, two or more homogenous processing devices, and/or two or more processing devices from multiple manufacturers. The example of FIG. 1 illustrates the security component(s) 102 operating independently with respect to the APs 104A and 104B and the separate memory devices 106A and 106B associated with each respective AP.

The communication channel(s) 116 may be implemented at least in part by one or more buses or interfaces, such as one or more serial peripheral interfaces (SPI(s)). The AP 104A may access the memory device 106A using communication channel(s) 116A, and the AP 104B may access the memory device 106B using communication channel(s) 116B. Each of the communication channel(s) 116 may include one or more signal conductors (e.g., one or more lines, one or more wires, one or more traces, and/or the like). The communication channel(s) 116 may include a single channel monitored by only one frequency monitor (e.g., the frequency monitor 108A) or expanded beyond the two frequency monitors 108A and 108B illustrated in FIG. 1 (e.g., the communication channel(s) 116 may include four channels monitored by four frequency monitors 108).

The AP(s) 104 each generates signals, such as a chip select (CS) signal 110 and clock signal 112, to control operation of the memory device(s) 106. The communication channel(s) 116A conduct the signals (e.g., the CS signal 110 and the clock signal 112) output by the AP 104A from the AP 104A to the memory device 106A, and the communication channel(s) 116B conduct the signals (e.g., the CS signal 110 and the clock signal 112) output by the AP 104B from the AP 104B to the memory device 106B. The AP(s) 104 may each use the CS signal 110 to activate memory within one or more of the memory device(s) 106. For example, the AP 104A may use the CS signal 110 to enable a specific memory chip among multiple memory chips connected to a common one of the communication channel(s) 116A (e.g., a common bus). When the CS signal for a particular memory chip is active, that chip is selected and can perform read or write operations. Thus, the CS signal 110 may be characterized as being a selection signal. The AP(s) 104 each uses the clock signal 112 to synchronize data transmission with one of the memory device(s) 106. In at least one embodiment, the CS signal 110 and the clock signal 112 may be implemented using any SPI protocol. Because, in at least one embodiment, the system 100 monitors only the CS signal 110 and the clock signal 112, the system 100 may operate across various derivative SPI protocols, including, but is not limited to, SPI,D (dual data lanes), SPI,Q (quad data lanes), and/or SPI,Octa (8 data lanes). Thus, communication between the AP(s) 104 and the memory device(s) 106 (over the communication channel(s) 116) is not limited to using any particular SPI. The communication channel(s) 116 may include data and/or control lines extending between the AP(s) 104 and the memory device(s) 106. For the sake of clarity, data lines 114 are shown in FIG. 1 that are used by the AP(s) 104 to send communications or signals to one or more other components (e.g., to the memory device(s) 106) that are monitored by the security component(s) 102. For example, the security component(s) 102 may monitor memory access requests (e.g., from the AP(s) 104) sent over the data lines 114 to prevent unauthorized operations, such as an attempt to write to a protected area or an attempt to erase protected portions of the memory of at least one of the memory device(s) 106. By way of a non-limiting example, the security component(s) 102 may monitor signals conducted by the data lines 114 between the AP(s) 104 and the memory device(s) 106 to protect the FW and/or software stored by the memory device(s) 106 from unauthorized access and/or tampering.

A potential attacker that controls the AP 104A, for example, can drive the clock signal 112 faster to allow the AP 104A to send memory access requests to the memory device 106A faster than the security component(s) 102 (e.g., the EROT) can monitor those memory access requests and thus evade the security protection provided by the security component(s). A successful attack on the memory device 106A could potentially create a denial of service (DoS), a permanent denial of service (PDoS), or other security risks. The system 100 uses the frequency monitor 108A to monitor the clock signal 112 and detect when it has a frequency that is above or below a threshold at which the security component(s) 102 can operate successfully.

The security component(s) 102 may be implemented at least in part by one or more hardware devices that include one or more circuits, such as an integrated circuit (IC), a Trusted Platform Module (TPM), a Baseboard Management Controller (BMC), a Hardware Security Module (HSM), a System on Chip (SoC), one or more Field-Programmable Gate Arrays (FPGAs), one or more processors, and/or the like. In at least one embodiment, the security component(s) 102 include(s) hardware (e.g., one or more circuits) implementing the frequency monitor(s) 108. The frequency monitor(s) 108 each detects activation of the CS signal 110, for example, asserted to perform a memory operation. In at least one embodiment, the frequency monitor 108A detects the activation of the CS signal 110 and monitors the rise and/or fall of the clock signal 112 to determine a clock frequency or rate, and compares the clock rate to a predetermined threshold. If the clock rate is above the predetermined threshold, the frequency monitor 108A can take steps to halt a potential attack and prevent potential damage to the system 100 (e.g., to circuitry implementing the memory device(s) 106, the security component(s) 102, and/or other components of the system 100). In at least one embodiment, the frequency monitor 108A can initiate a reset/restart of the AP 104A, initiate a restart of the memory device 106A, and/or resume frequency monitor operations. In at least one embodiment, the frequency monitor 108A notifies software (e.g., an operating system, a hypervisor, data center management software, and/or others, performed by the AP 104A and/or one or more other processors of the system 100) to intervene and the software performs the reset/restart operations above.

Figure 2:
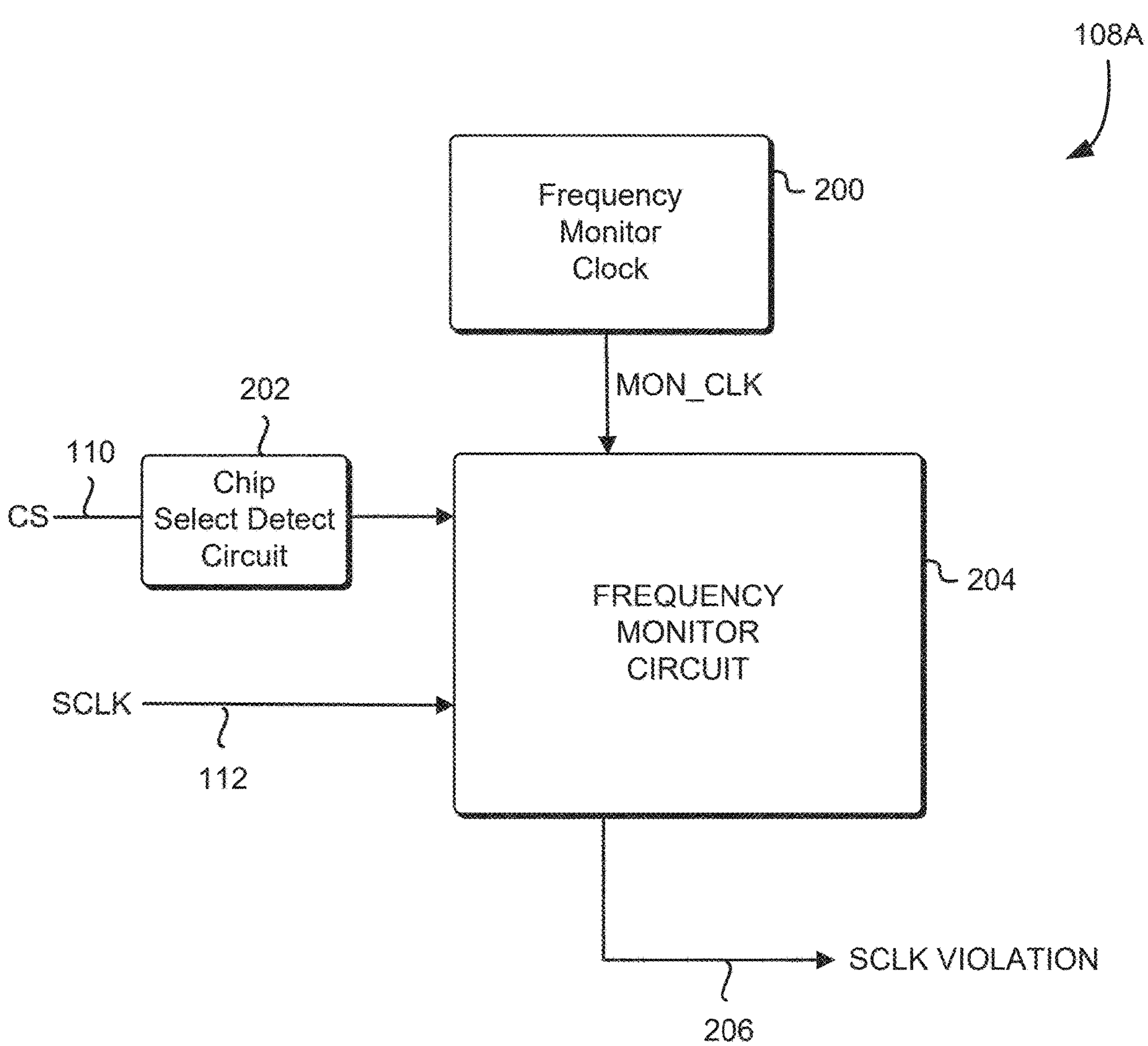
FIG. 2 is a functional block diagram illustrating an example frequency monitor of the system of FIG. 1, in accordance with at least one embodiment.

FIG. 2 is a functional block diagram illustrating the frequency monitor 108A of FIG. 1, in accordance with at least one embodiment. In at least one embodiment, one or more other ones of the frequency monitor(s) 108 (e.g., the frequency monitor 108B) may be implemented using the components illustrated in and described with respect to FIG. 2. In at least one embodiment, the frequency monitor 108A includes a frequency monitor clock (MON_CLK) 200 having a predetermined frequency. In at least one embodiment, the frequency of the MON_CLK 200 may be an editable parameter that may be modified, for example, by a user. In at least one embodiment, the MON_CLK 200 has an operating frequency of 1 gigahertz (GHz). In accordance with the Nyquist rate, a monitor clock frequency of 1.0 GHz permits frequency monitoring up to 500 megahertz (MHz). In at least one embodiment, the predetermined frequency of the MON_CLK 200 is a multiple (e.g., twice, three times, ten times, etc.) of the predetermined threshold (e.g., the high threshold frequency). However, the frequency of the MON_CLK 200 can be any frequency selected for operation with the selected security component(s) 102 (e.g., the EROT), and the selected memory device(s) (e.g., the memories 106A and 106B). Current flash devices operate below 200 MHz, which may permit the frequency monitor 108A to provide device protection to devices (e.g., to the memory device 106A) with current and future device operating capabilities.

A chip select detect circuit 202 receives the CS signal 110 sent by the AP 104A to the memory device 106A, and detects activation of the CS signal 110 with respect to the memory device 106A. In at least one embodiment, the frequency monitor 108A is only active when the CS signal 110 is active. Thus, in at least one embodiment, the CS signal 110 activates the frequency monitor 108A.

In at least one embodiment, a frequency monitor circuit 204 begins to monitor the clock signal 112 upon activation of the CS signal 110. In at least one embodiment, the frequency monitor circuit 204 can detect the rising edge of the clock signal 112, the falling edge of the clock signal 112, or both the rising and falling edges of the clock signal 112.

In at least one embodiment, the frequency monitor circuit 204 monitors both the rising edge to falling edge, and the falling edge to rising edge of the clock signal 112. This permits operation of the frequency monitor 108A with both single data rate (SDR) memory architectures, which transfers data (e.g., read or write data) once per clock cycle as well as double data rate (DDR) memory architectures, which can transfer data on both the rising edge and the falling edge of the clock signal 112.

In at least one embodiment, the frequency monitor circuit 204 counts the number of cycles of the MON_CLK 200 that occur during a single period of the clock signal 112. For example, if the MON_CLK 200 is operating at a frequency of 1.0 GHz and the clock signal 112 is operating at a frequency of 100 MHz, there will be ten cycles of the MON_CLK 200 for every cycle of the clock signal 112. If the clock signal 112 is operating at a higher frequency than permitted (e.g., greater than 100 MHz), there will be fewer cycles of the MON_CLK 200 per cycle of the clock signal 112. For example, using the example above where the MON_CLK 200 operates at a frequency of 1.0 GHz, if the frequency monitor circuit 204 only counts eight cycles of the MON_CLK 200 per cycle of the clock signal 112, this would indicate that the clock signal 112 is operating at a frequency of approximately 125 MHz and a frequency violation would exist. Under these circumstances, the frequency monitor circuit 204 would activate a clock signal violation signal 206 (e.g., SCLK violation signal).

Although the system 100 has been described with respect to clock frequencies that exceed a frequency threshold, the same principles can be applied to detect a clock frequency that is too low for normal operation. As explained herein, too few cycles of the MON_CLK 200 per cycle of the clock signal 112 indicates that the clock signal 112 is operating above a high threshold frequency. Conversely, too many cycles of the MON_CLK 200 per cycle of the clock signal 112 indicates that the clock signal 112 is operating below a low threshold frequency. For example, if the MON_CLK 200 operates at a frequency of 1.0 GHz and the frequency monitor 108A counts twenty cycles of the MON_CLK 200 per cycle of the clock signal 112, the clock signal 112 is operating at a frequency of approximately 50 MHz, which may indicate a potential attack on the system 100 and a low frequency violation would exist.

Figure 3A:
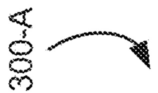
FIG. 3A illustrates a series of waveforms depicting normal operation of the system of FIG. 1, in accordance with at least one embodiment.
Figure 3A:
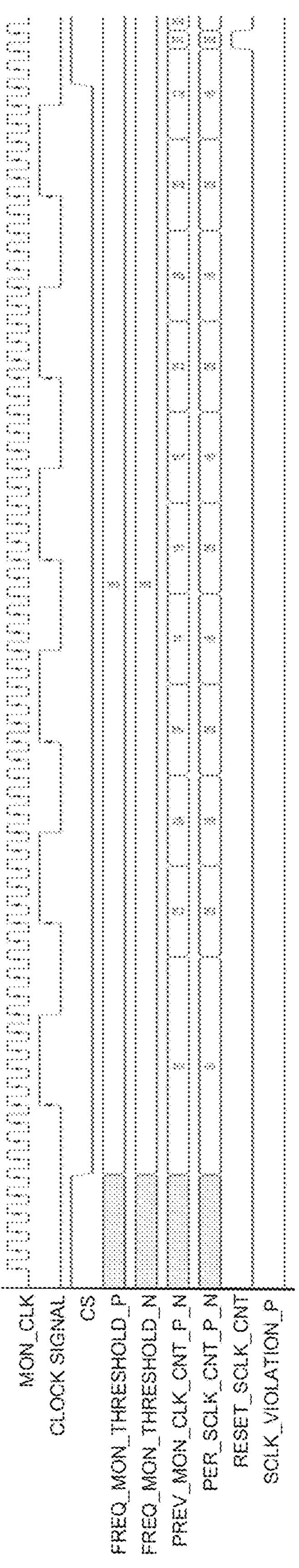

FIG. 3A illustrates waveforms 300-A depicting normal operation of the system 100, in accordance with at least one embodiment. FIG. 3A depicts the MON_CLK 200 producing a signal labeled "MON_CLK," the clock signal 112 labeled "CLOCK SIGNAL," and the CS signal 110 labeled "CS." In at least one embodiment, FIG. 3A depicts the MON_CLK 200 operating at a frequency of 1.0 GHz, the clock signal 112 designed or specified to be operating at a frequency of 100 MHz, and the clock signal 112 actually operating at a frequency of 100 MHz. Thus, FIG. 3A illustrates ten cycles of the MON_CLK 200 for every cycle of the clock signal 112. As a result, the frequency monitor 108A determines that there is no violation of the clock frequency requirement and the clock signal violation signal 206 would not be activated.

Figure 3B:
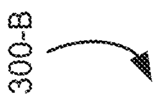
FIG. 3B illustrates a series of waveforms depicting detection of a violation in the operation of the system of FIG. 1, in accordance with at least one embodiment.
Figure 3B:
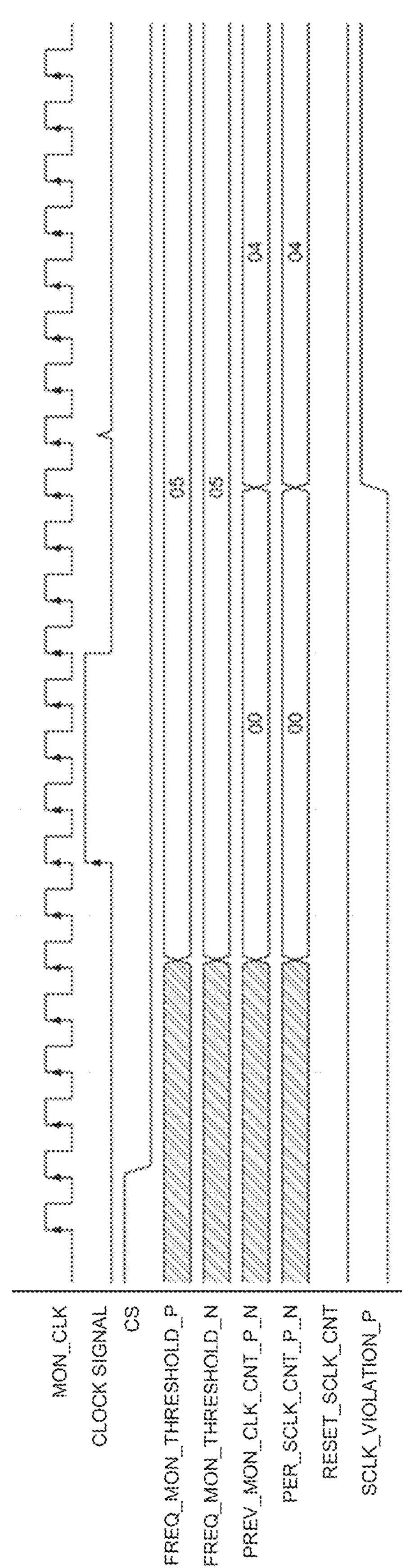

FIGS. 3A and 3B also illustrate additional waveforms used to determine the presence of a frequency violation. FIGS. 3A and 3B depict the clock signal violation signal 206 labeled "SCLK_VIOLATION_P" In at least one embodiment, the frequency monitor circuit 204 generates a FREQ_MON_THRESHOLD_P signal that provides a threshold value for the clock signal 112. The FREQ_MON_THRESHOLD_P signal is the expected number of cycles of the MON_CLK 200 in one-half cycle of the clock signal 112 as measured from the rising edge to the falling edge of the clock signal 112. In the illustrated example where the MON_CLK 200 operates at 1.0 GHz and the operational frequency of the clock signal 112 is 100 MHz, FIG. 3A illustrates that five cycles of the MON_CLK 200 are expected during the half-cycle between the rising edge and the falling edge of the clock signal 112.

In at least one embodiment, the frequency monitor circuit 204 generates a FREQ_MON_THRESHOLD_N signal that provides a threshold value for the clock signal 112. The FREQ_MON_THRESHOLD_N signal is the expected number of cycles of the MON_CLK 200 per half-cycle of the clock signal 112 as measured from the falling edge to the rising edge of the clock signal 112. In the example where the MON_CLK 200 operates at 1.0 GHz and the operational frequency of the clock signal 112 is 100 MHz, FIG. 3A illustrates that five cycles of the MON_CLK 200 are expected during the half-cycle between the falling edge and the rising edge of the clock signal 112.

The combination of the FREQ_MON_THRESHOLD_P signal and the FREQ_MON_THRESHOLD_N signal provides a total count of the expected number of cycles of the MON_CLK 200 during a complete cycle of the clock signal 112. In at least one embodiment, the frequency monitor circuit 204 can declare a frequency violation (e.g., assert the clock signal violation signal 206) if the expected number of cycles of the MON_CLK 200 per cycle of the clock signal 112 is incorrect for either the FREQ_MON_THRESHOLD_P signal or the FREQ_MON_THRESHOLD_N signal or both. This permits the frequency monitor circuit 204 to detect an attempt to defeat the security component(s) 102 (e.g., EROT) by increasing the frequency of the clock signal 112 during any phase of the clock signal 112.

In at least one embodiment, the values for the FREQ_MON_THRESHOLD_P signal and FREQ_MON_THRESHOLD_N signal are software programmable and can be selected (e.g., by a user and/or an automated process) based on system level requirements, such as the frequency of the MON_CLK 200, the operational frequency of the memory 106A, and/or the operational frequency of the security component(s) 102 (e.g., EROT).

In at least one embodiment, the frequency monitor circuit 204 generates a PREV_MON_CLK_CNT_P_N signal, which provides a snapshot of the frequency counter. In at least one embodiment, a potential attacker can manipulate either the rising or falling edge of the clock signal 112 by making the edge rise or fall sooner than expected. This can be done even while maintaining the overall frequency of the clock signal 112. In accordance with SPI protocol, if data is driven at the rising edge of the clock signal 112, it is registered at the target (e.g., the memory 106A) at the falling edge of the clock signal. Conversely, in accordance with SPI protocol, if data is driven at the falling edge of the clock signal 112, it is registered at the target (e.g., the memory 106A) at the rising edge of the clock signal. By measuring the period from the rising edge to falling edge and the period from falling edge to rising edge of the clock signal 112, the frequency monitor circuit 204 can force the period to be larger than or equal to the individual thresholds determined by the FREQ_MON_THRESHOLD_P signal and the FREQ_MON_THRESHOLD_N signal. If the period is smaller than the individual thresholds determined by the FREQ_MON_THRESHOLD_P signal and FREQ_MON_THRESHOLD_N signal, the frequency monitor circuit 204 will declare a frequency violation and activate the clock signal violation signal 206.

In at least one embodiment, the waveforms 300-A and 300-B of FIGS. 3A-3B also include a PER_SCLK_CNT_P_N signal that provides a count of the number of cycles of the MON_CLK 200 per half cycle of the clock signal 112. The count is updated every time the frequency monitor 204 detects the rising edge of the clock signal 112 or the falling edge of the clock signal 112.

In at least one embodiment, the waveforms 300-A and 300-B of FIGS. 3A-3B include a RESET_SCLK_CNT signal to reset counters within the frequency monitor circuit 204. In at least one embodiment, the frequency monitor circuit 204 only monitors the frequency of the clock signal 112 when the CS signal 110 is active. When the CS signal 110 switches to an inactive state, the frequency monitor circuit 204 can generate the RESET_SCLK_CNT signal, as illustrated in FIG. 3A, signal to reset counters, such as the counters for the PREV_MON_CLK_CNT_P_N signal and the PER_SCLK_CNT_P_N signal.

FIG. 3B illustrates waveforms 300-B depicting detection of a violation in the operation of the system 100 (see FIG. 1), in accordance with at least one embodiment. Like FIG. 3A, FIG. 3B depicts the MON_CLK 200 producing a signal labeled "MON_CLK," the clock signal 112 labeled "CLOCK SIGNAL," and the CS signal 110 labeled "CS." FIG. 3B depicts operation of the frequency monitor 108A where the clock signal 112 is operating at a frequency higher than permitted. In FIG. 3B, the MON_CLK 200 is operating at a frequency of 1.0 GHz and the clock signal 112 is designed or specified to be operating at a frequency of 100 MHz. However, the PER_SCLK_CNT_P_N signal indicates that only four cycles of the MON_CLK 200 were measured in the first half-cycle of the clock signal 112 from the rising edge to the falling edge of the clock signal 112. This value is less than the threshold value of five cycles of the MON_CLK 200 in the first half of the clock signal 112 cycle from the rising edge to the falling edge of the clock signal 112 as specified by the FREQ_MON_THRESHOLD_P signal. As noted above, this indicates that the clock signal 112 is operating at approximately 125 MHz and a frequency violation exists. Under these circumstances, the frequency monitor circuit 204 of the frequency monitor 108A activates the clock signal violation signal 206 as shown as the bottom waveform in FIG. 3B.

In at least one embodiment, the frequency monitor (e.g., the frequency monitor 108A) takes remedial actions upon detection of a frequency violation, including gating the clock signal 112. In FIG. 3B, the clock signal 112 waveform illustrates a small blip after the clock signal violation signal 206 is activated. The blip is not part of the clock signal 112, but is a marker intended to mark the point in time where the rising edge of a new cycle of the clock signal 112 would begin, but is prevented from occurring by the gating activity of the frequency monitor (e.g., the frequency monitor 108A).

Figure 4:
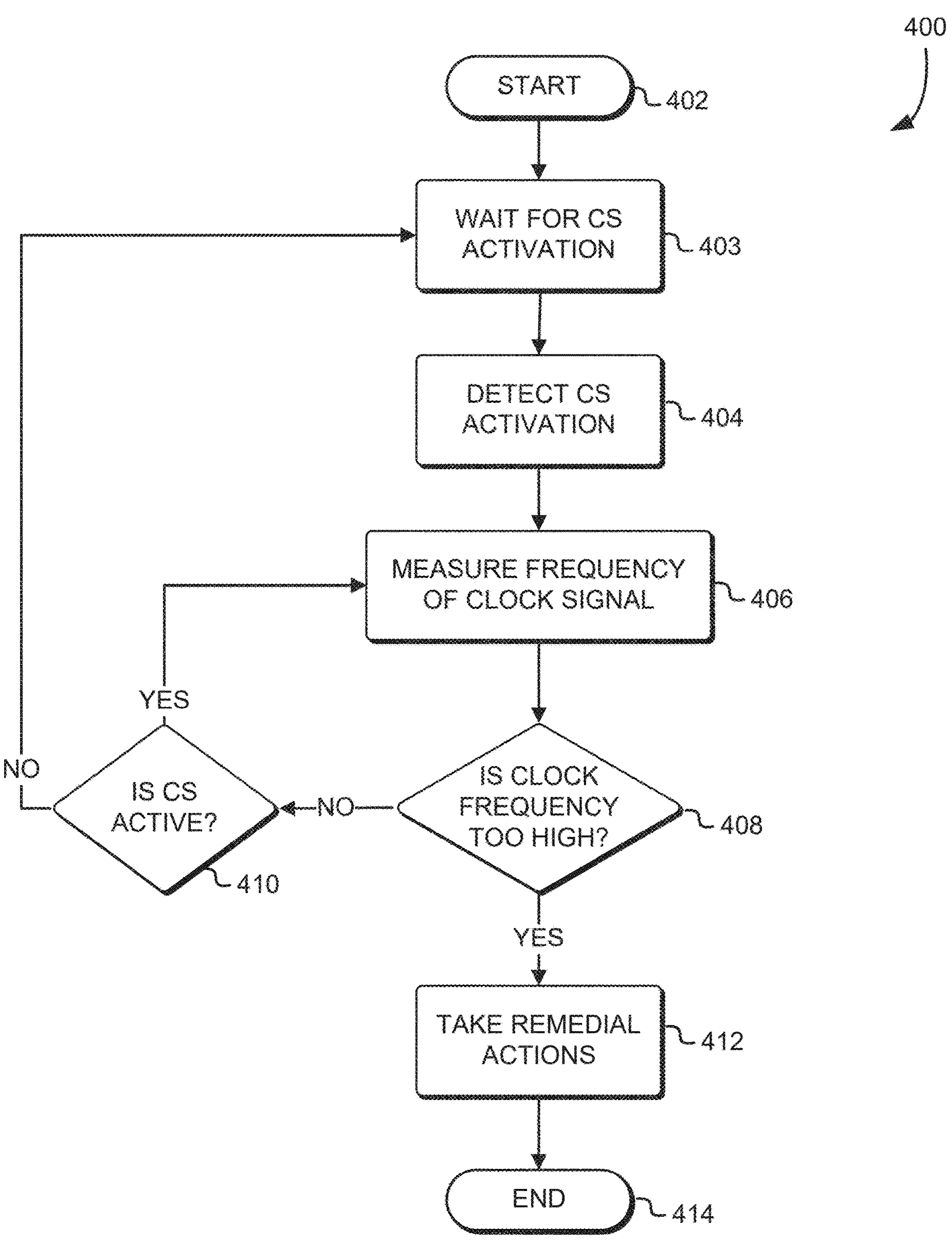
FIG. 4 is a flowchart illustrating an example method, in accordance with at least one embodiment.

FIG. 4 is a flowchart illustrating an example method 400, in accordance with at least one embodiment. In at least one embodiment, referring to FIG. 1, the system 100 (e.g., the frequency monitor(s) 108) may perform the method 400. For ease of illustration, the method 400 will be described as being performed by the frequency monitor 108A but the method 400 may be performed by any of the frequency monitor(s) 108. Referring to FIG. 4, at a start 402, in at least one embodiment, the frequency monitor 108A is configured for operation. For example, the operational frequency of the MON_CLK 200, one or more threshold frequency values (e.g., indicating a high threshold frequency and/or a low threshold frequency), and/or the desired and/or specified operational frequency of the clock signal 112 may be provided to the frequency monitor 108A.

In first block 403, the frequency monitor 108A (e.g., the chip select detect circuit 202 of the frequency monitor 108A) waits for activation of the CS signal 110. In block 404, the frequency monitor 108A (e.g., the chip select detect circuit 202 of the frequency monitor 108A) detects activation of the CS signal 110 and in block 406, the frequency monitor circuit 204 of the frequency monitor 108A measures the frequency of the clock signal 112. In at least one embodiment, the frequency of the clock signal 112 may be measured by counting the number of cycles of the MON_CLK 200 during a single cycle of the clock signal 112. However, other frequency measurement techniques may be satisfactorily employed to measure the frequency of the clock signal 112. These may include, without limitation, universal counters that measure the number of cycles within a predefined unit of time, and/or radio frequency counters that may employ pre-scalers to shift a high frequency signal to a lower frequency signal.

In decision block 408, the frequency monitor 108A determines whether the frequency of the clock signal 112 measured in block 406 is too high. In at least one embodiment, the desired operational frequency of the clock signal 112 is known. In at least one embodiment, a threshold frequency (e.g., the threshold frequency value(s)) may be set to define an upper permissible operational frequency for the clock signal 112.

If the operational frequency of the clock signal 112 is not too high, the result of decision block 408 is NO and in decision block 410, the frequency monitor circuit 204 determines whether the CS signal 110 is still active. If the CS signal 110 is no longer active, the result of decision block 410 is NO, the memory access request has been completed, and the frequency monitor 108A returns to block 403 to await further attempts to access the memory device 106A. If the CS signal 110 is still active, the result of decision block 410 is YES, the frequency monitor 108A returns to block 406 and the frequency monitor 108A continues to monitor and measure the frequency of the clock signal 112. The frequency monitor 108A monitors and measures the clock signal 112 frequency so long as the CS signal 110 is active.

If the operational frequency for the clock signal 112 is too high, the result of decision block 408 is YES and in block 412, the frequency monitor 108A initiates remedial actions (e.g., by generating the clock signal violation signal 206). In at least one embodiment, the frequency monitor 108A can initiate a reset/restart of the AP 104A, initiate a restart of the memory device 106A, and/or resume frequency monitor operations. In at least one embodiment, the frequency monitor 108A sends the clock signal violation signal 206 to software, which notifies the software to intervene and causes the software to perform the reset/restart operations above with respect to the AP 104A and/or the memory device 106A. Thus, the clock signal violation signal 206 may function as a control signal within the system 100. The method 400 may end after block 412 at block 414.

In at least one embodiment, the remedial actions can also include error recovery operations. The security component(s) 102 (e.g., EROT) can silently terminate a violating command by gating the clock signal 112 (or limiting the clock signal 112 based at least in part on the threshold frequency value(s)) to maintain an appropriate frequency while keeping the CS signal 110 in an active state. For example, the security component(s) 102 may limit the frequency of the clock signal 112 to a value between the high frequency threshold and the low frequency threshold. By way of another non-limiting example, the security component(s) 102 may limit the frequency of the clock signal 112 at most at the high frequency threshold. The security component(s) 102 may provide details of the violation using an interrupt process. The security component(s) 102 may send one or more commands to the peripheral device (e.g., the memory device(s) 106), for example, to prevent execution of a potentially destructive pending erase commend. In at least one embodiment, the system 100 (e.g., the security component(s) 102) can send one or more notifications and/or instructions to software performed by at least one of the AP(s) 104 to reset hardware and permit a graceful resumption of operations after at least one processor (e.g., of the at least one AP 104) takes one or more appropriate actions to address detected violations.

In addition to, or instead of, the remedial actions described above, the system 100 can provide reporting functions to log one or more violations to a controlling processor (e.g., one or more of the AP(s) 104). The reports can include information related to violating commands, clock frequency violations, and/or the like.

In at least one embodiment, the frequency threshold for a violation is software programmable and can be adjusted for different hardware configurations. For example, different implementations of the AP(s) 104, CPU, DPU, GPU, and/or the memory device(s) 106 may have different operational frequency limitations. The internal clock frequency of the MON_CLK 200 can be configured with software to thereby set a desired threshold frequency.

In at least one embodiment, the frequency monitor circuit 204 monitors the clock signal 112 to detect both the clock rising edge to falling edge, and the falling to rising edge. This permits the frequency monitor(s) 108 to monitor any SPI protocol. This makes the system 100 compatible with both SDR and DDR memory architectures.

The system 100 is not limited to use with any particular type of communication channel(s) (e.g., SPI), and is applicable to any implementations in which at least a portion of the system 100 (e.g., the memory device(s) 106) might be vulnerable to attack by modifying (e.g., increasing and/or decreasing) the clock frequency of signals communicated over the communication channel(s) 116. For example, the communication channel(s) 116 may be implemented using SPI, Inter-Integrated Circuit (I2C), Improved Inter-Integrated Circuit (I3C), and/or Low-Speed Input/Output (LSIO) interfaces. The system 100 is capable of detecting clock frequencies that exceed a frequency threshold, as well as detecting a clock frequency that is too low for normal operation.

Figure 5A:
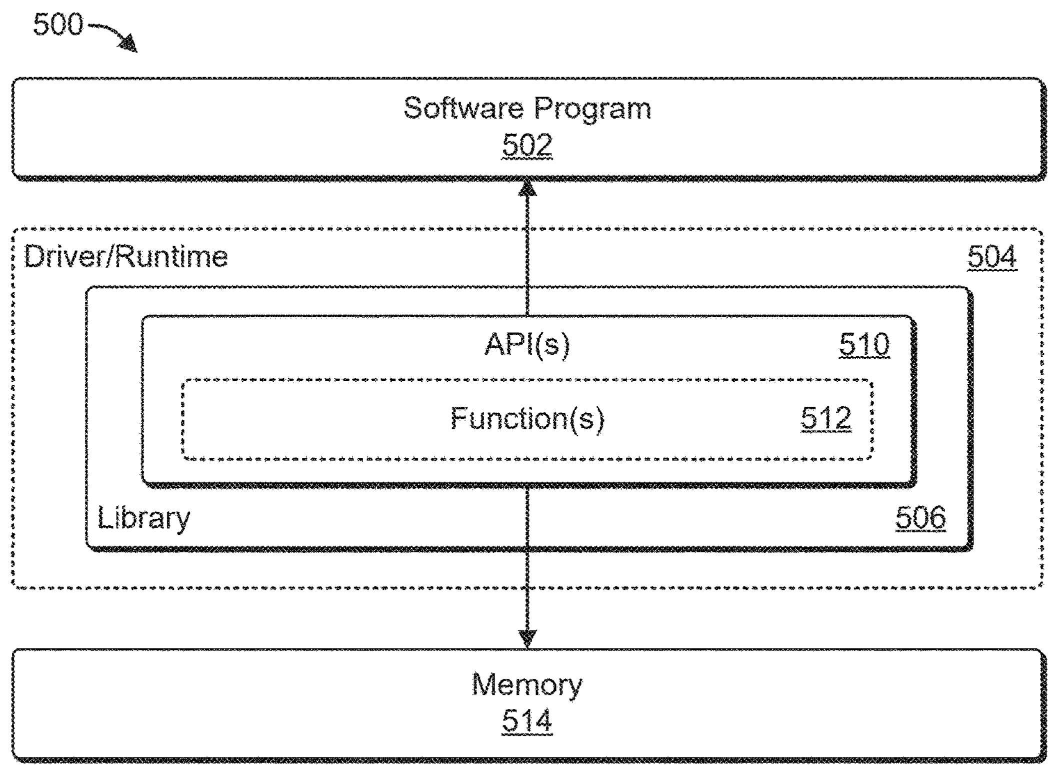
FIG. 5A illustrates an example of a system that includes a driver and/or runtime including one or more libraries to provide one or more application programming interfaces (APIs), in accordance with at least one embodiment.

FIG. 5A illustrates an example of a system 500 that includes one or more drivers and/or one or more runtimes (illustrated as reference numeral 504) including one or more libraries 506 to provide one or more application programming interfaces ("API(s)") 510, in accordance with at least one embodiment. In at least one embodiment, the system 500 includes the driver(s) 504 and/or the runtime(s) 504 including the library(ies) 506 to provide to the API(s) 510. In at least one embodiment, the API(s) 510 is/are sets of software instructions that, if executed, cause one or more processors (e.g., processor(s) 522 illustrated in FIG. 5B) to perform one or more computational operations. In at least one embodiment, one or more of the API(s) 510 is/are distributed or otherwise provided as a part of one or more of the library(ies) 506, one or more of the runtime(s) 504, one or more of the driver(s) 504, and/or one or more component of any other grouping of software and/or executable code further described herein. In at least one embodiment, one or more of the API(s) 510 perform one or more computational operations in response to invocation by one or more software programs 502.

In at least one embodiment, one or more of the software program(s) 502 is/are a software module and/or include(s) one or more software modules. In at least one embodiment, a software module is as further illustrated non-exclusively in FIG. 5B as one or more modules 524 and described with respect thereto. In at least one embodiment, one or more of the software program(s) 502 is/are a collection of software code, commands, instructions, and/or other sequences of text to instruct a computing device (e.g., at least one of the AP(s) 104) to perform one or more computational operations and/or invoke one or more other sets of instructions, such as the API(s) 510 or API function(s) 512, to be executed by the computing device. In at least one embodiment, functionality provided by one or more of the API(s) 510 includes the API function(s) 512, such as those usable to accelerate one or more portions of the software program(s) 502 using one or more parallel processing units (PPUs), such as graphics processing units (GPUs).

In at least one embodiment, one or more of the API(s) 510 is/are one or more hardware interfaces to one or more circuits to perform one or more computational operations. In at least one embodiment, one or more of the API(s) 510 described herein are implemented as one or more circuits to perform one or more techniques described in connection with FIGS. 1-4. In at least one embodiment, one or more of the software program(s) 502 include instructions that, if executed, cause one or more hardware devices and/or circuits to perform one or more techniques further described in connection with FIGS. 1 and 2. In at least one embodiment, the system 500 includes one or more or all components of the system 100 described in relation to FIG. 1, and the system 500 may perform one or more or all of the processes and/or operations that the systems and components of the system 100 perform.

In at least one embodiment, the software program(s) 502, such as user-implemented software programs, utilize one or more of the API(s) 510 to perform various computing operations, such as memory reservation, matrix multiplication, arithmetic operations, and/or any computing operation performed by PPUs, such as GPUs, as further described herein. In at least one embodiment, the function(s) 512 include a set of callable functions provided by one or more of the API(s) 510 that are referred to herein as APIs, API functions, software functions, and/or functions, that individually perform one or more computing operations, such as computing operations related to parallel computing. In at least one embodiment, one or more of the API(s) 510 perform a software operation to set the frequency of the monitor frequency generator (e.g., the MON_CLK 200), and/or perform other operations described herein (e.g., in connection with FIGS. 1-4).

Figure 5B:
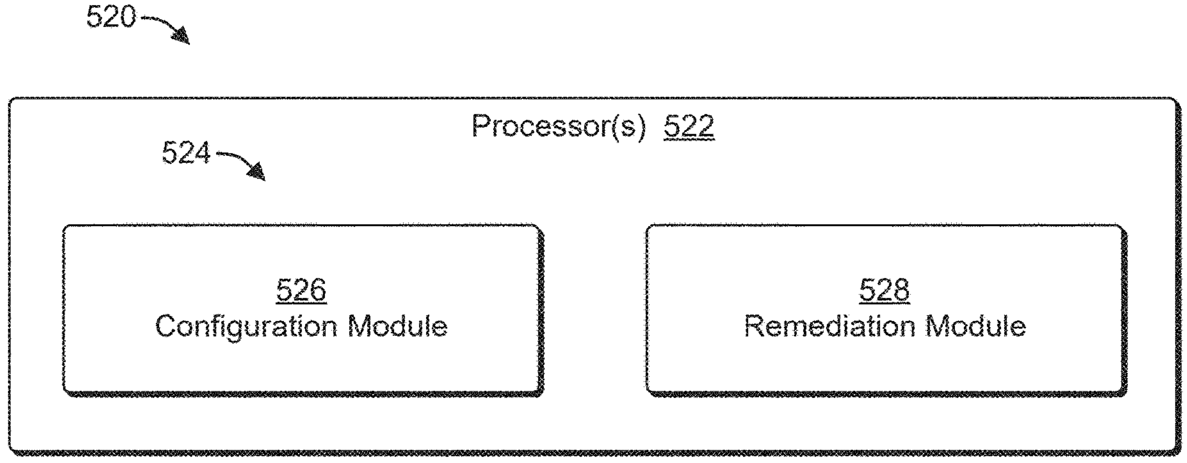
FIG. 5B is block diagram illustrating an example of a processor and modules, according to at least one embodiment.

In at least one embodiment, one or more of the software program(s) 502 interact or otherwise communicate with one or more of the API(s) 510 to perform one or more computing operations using one or more processors (e.g., processor(s) 522 illustrated in FIG. 5B), such as one or more PPUs, such as GPUs. In at least one embodiment, one or more computing operations using one or more PPUs include at least one or more groups of computing operations to be accelerated by execution at least in part by said one or more PPUs. In at least one embodiment, one or more of the software program(s) 502 interact with one or more of the API(s) 510 to set the threshold frequency described with respect to decision block 408 in FIG. 4, and/or perform other operations described herein (e.g., in connection with FIGS. 1-4).

In at least one embodiment, an interface is software instructions that, if executed, provide access to one or more of the function(s) 512 provided by one or more of the API(s) 510. In at least one embodiment, one or more of the software program(s) 502 use(s) a local interface when a software developer compiles one or more of the software program(s) 502 in conjunction with one or more of the library(ies) 506 including or otherwise providing access to one or more of the API(s) 510. In at least one embodiment, one or more of the software program(s) 502 is/are compiled statically in conjunction with one or more pre-compiled ones of the library(ies) 506 and/or uncompiled source code including instructions to perform one or more of the API(s) 510. In at least one embodiment, one or more of the software program(s) 502 are compiled dynamically and the dynamically compiled software program(s) utilize a linker to link to one or more pre-compiled ones of the library(ies) 506, including one or more of the API(s) 510.

In at least one embodiment, one or more of the software program(s) 502 use(s) a remote interface when a software developer executes a software program that utilizes or otherwise communicates with at least one of the library(ies) 506 including one or more of the API(s) 510 over a network or other remote communication medium. In at least one embodiment, one or more of the library(ies) 506 including one or more of the API(s) 510 are to be performed by a remote computing service, such as a computing resource services provider. In at least one embodiment, one or more of the library(ies) 506 including one or more particular APIs (of the API(s) 510) is/are to be performed by any other computing host providing the particular API(s) to one or more of the software program(s) 502.

In at least one embodiment, a processor (e.g., processor(s) 522 illustrated in FIG. 5B) performing or using one or more particular ones of the software program(s) 502 calls, uses, performs, and/or otherwise implements one or more of the API(s) 510 to allocate and otherwise manage memory 514 to be used by the particular software program(s). In at least one embodiment, one or more particular ones of the software program(s) 502 utilize one or more of the API(s) 510 to allocate and otherwise manage the memory 514 to be used by one or more portions of the particular software program(s) to be accelerated using one or more PPUs, such as GPUs, or any other accelerator or processor further described herein. In at least one embodiment, one or more of the software program(s) 502 request one or more neural networks to perform signal processing using one or more of the function(s) 512 provided by one or more of the API(s) 510. In at least one embodiment, memory in and/or connected to the AP(s) 104 implements memory 514.

In at least one embodiment, one or more of the API(s) 510 is an API to facilitate parallel computing. In at least one embodiment, one or more of the API(s) 510 is any other API further described herein. In at least one embodiment, one or more of the API(s) 510 is/are provided by one or more of the driver(s) 504 and/or one or more of the runtime(s) 504. In at least one embodiment, one or more of the API(s) 510 is/are provided by a CUDA user-mode driver. In at least one embodiment, one or more of the API(s) 510 is/are provided by a CUDA runtime. In at least one embodiment, one or more of the driver(s) 504 is/are data values and software instructions that, if executed, perform and/or otherwise facilitate operation of one or more of the function(s) 512 of one or more of the API(s) 510 during load and execution of one or more portions of at least one of the software program(s) 502. In at least one embodiment, one or more of the runtime(s) 504 is/are data values and/or software instructions that, if executed, perform or otherwise facilitate operation of one or more of the function(s) 512 of one or more of the API(s) 510 during execution of at least one of the software program(s) 502. In at least one embodiment, one or more particular ones of the software program(s) 502 utilize one or more of the API(s) 510 implemented and/or otherwise provided by one or more of the driver(s) 504 and/or one or more of the runtime(s) 504 to perform combined arithmetic operations by the particular software program(s) during execution by one or more PPUs, such as GPUs.

In at least one embodiment, one or more of the software program(s) 502 utilize one or more of the API(s) 510 provided by one or more of the driver(s) 504 and/or one or more of the runtime(s) 504 to perform combined arithmetic operations of one or more PPUs, such as GPUs. In at least one embodiment, one or more of the API(s) 510 provide combined arithmetic operations through one or more of the driver(s) 504 and/or one or more of the runtime(s) 504, as described above. In at least one embodiment, one or more of the software program(s) 502 utilize one or more of the API(s) 510 provided by one or more of the driver(s) 504 and/or one or more of the runtime(s) 504 to allocate or otherwise reserve one or more blocks of the memory 514 of one or more PPUs, such as GPUs. In at least one embodiment, one or more of the software program(s) 502 utilize one or more of the API(s) 510 provided by one or more of the driver(s) 504 and/or one or more of the runtime(s) 504 to allocate or otherwise reserve blocks of the memory 514.

In at least one embodiment, to improve usability of one or more particular ones of the software program(s) 502 and/or improve performance, one or more portions of the particular software programs are to be accelerated by one or more PPUs (such as GPUs). In at least one embodiment, one or more of the function(s) 512 receive one or more input parameters indicating one or more inputs to one or more neural networks and/or other data to be utilized by the neural network(s), such as one or more hyperparameters of the neural network(s). In at least one embodiment, the input parameter(s) include the one or more inputs and/or the other data. In at least one embodiment, the input parameter(s) include one or more pointers to one or more memory locations where the input(s) and/or the other data is/are stored.

In at least one embodiment, the system 500 includes at least one processor (e.g., processor(s) 522 illustrated in FIG. 5B) including one or more circuits to perform one or more software programs to combine two or more of the API(s) 510 into a single API. In at least one embodiment, the system 500 includes at least one processor (e.g., processor(s) 522 illustrated in FIG. 5B) that uses one or more of the API(s) 510 set the clock frequency of the MON_CLK 200, the desired operational frequency of the clock signal 112 or threshold frequency for a violation, and/or otherwise perform operations described herein. In at least one embodiment, the system 500 includes at least one processor (e.g., processor(s) 522 illustrated in FIG. 5B) that uses one or more of the API(s) 510 to perform one or more operations illustrated in and/or described with respect to one or more of FIGS. 1-4, such as one or more processes illustrated in FIGS. 1 and 2 or portion(s) thereof. In at least one embodiment, the system 500 includes at least one processor (e.g., processor(s) 522 illustrated in FIG. 5B) to perform one or more of the function(s) 512, such as those described in connection with FIGS. 1 and 2. In at least one embodiment, one or more of the API(s) 510 is to be performed by hardware described in connection with FIGS. 6-8.

FIG. 5B is block diagram 520 illustrating example processor(s) 522 and the module(s) 524, according to at least one embodiment. Referring to FIG. 5B, in at least one embodiment, the processor(s) 522 may be implemented by the processor(s) of the AP(s) 104. In at least one embodiment, the processor(s) 522 may perform one or more processes such as those described herein with respect to the AP(s) 104, and/or may otherwise perform operations described herein. In at least one embodiment, the processor(s) 522 perform(s) one or more processes such as those described in connection with FIGS. 1-4.

In at least one embodiment, the processor(s) 522 include one or more processors such as those described in connection with FIGS. 6-8. In at least one embodiment, processor(s) 522 may be any suitable processing unit and/or combination of processing units, such as one or more CPUs, GPUs, DPUs, GPGPUs, PPUs, and/or variations thereof. The processor(s) 522 includes the module(s) 524, which may include a configuration module 526 to provide configuration parameters for the frequency monitor 108, such as the frequency of the frequency clock (e.g., the MON_CLK 200) and/or the desired operational frequency for the clock signal 112 or the violation threshold for the clock signal 112. The module(s) 524, which may include a remediation module 528 to control remediation activities in the event of a frequency violation. These may include software to initiate a reset/restart of at least one of the AP(a) 104, initiate a restart of at least one of the memory device(s) 106, and resume frequency monitor operations.

The module(s) 524 may be distributed among multiple processors that communicate over a bus, network, by writing to shared memory, and/or any suitable communication process such as those described herein. In at least one embodiment, the module(s) 524 may include processor executable instructions that implement at least one configuration module for the frequency monitor(s) 108 and at least one remediation module to intervene in the event of a frequency violation.

As used in any implementation described herein, unless otherwise clear from context or stated explicitly to contrary, a module refers to any combination of software logic, firmware logic, hardware logic, and/or circuitry configured to provide functionality described herein. Software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. Modules may, collectively or individually, be embodied as circuitry that forms part of a larger system, for example, an integrated circuit (IC), system on-chip (SoC), and so forth. a module performs one or more processes in connection with any suitable processing unit and/or combination of processing units, such as one or more CPUs, GPUs, GPGPUs, DPUs, PPUs, and/or variations thereof.

In at least one embodiment, as used in any implementation described herein, unless otherwise clear from context or stated explicitly to contrary, terms such as "module" and nominalized verbs (e.g., image manager, image analyzer, analytics engine, controller, and/or other terms) each refers to any combination of software logic, firmware logic, hardware logic, and/or circuitry configured to provide functionality described herein. In at least one embodiment, software may be embodied as a software package, code and/or instruction set or instructions, and "hardware," as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

Logic

Figure 6A:
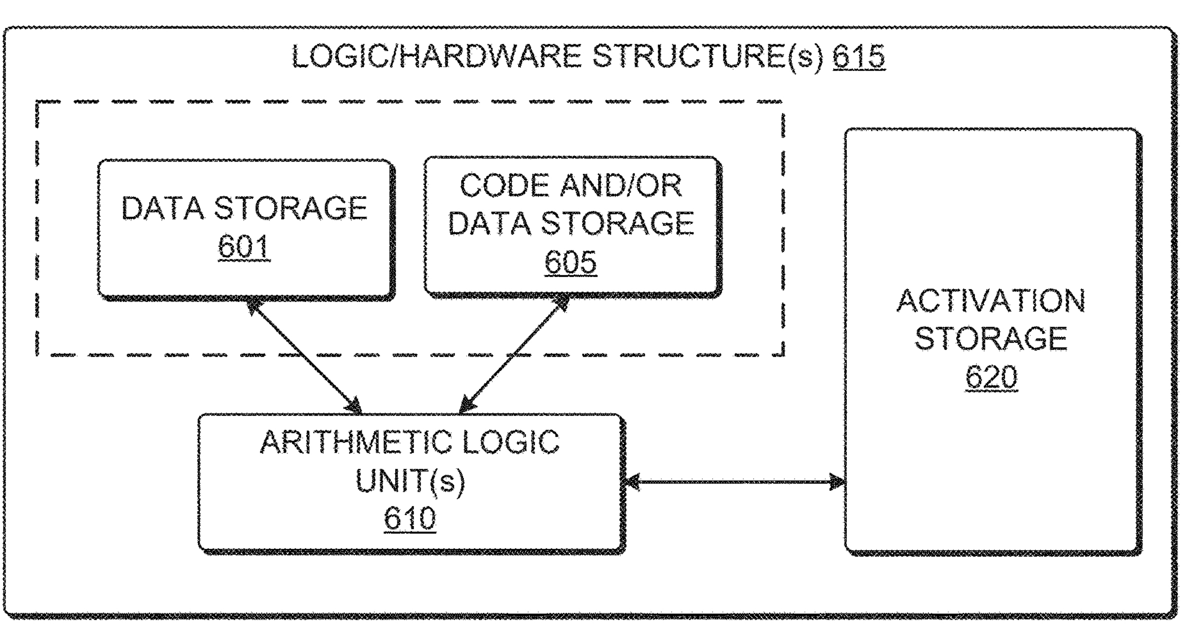
FIG. 6A illustrates logic, according to at least one embodiment.

FIG. 6A illustrates logic 615 which, as described elsewhere herein, can be used in one or more devices to perform operations such as those discussed herein in accordance with at least one embodiment. In at least one embodiment, logic 615 is used to perform inferencing and/or training operations associated with one or more embodiments. In at least one embodiment, logic 615 is inference and/or training logic. Details regarding logic 615 are provided below in conjunction with FIGS. 6A and/or 6B. In at least one embodiment, logic refers to any combination of software logic, hardware logic, and/or firmware logic to provide functionality or operations described herein, wherein logic may be, collectively or individually, embodied as circuitry that forms part of a larger system, for example, an integrated circuit (IC), system-on-chip (SoC), or one or processors (e.g., CPU, GPU).

In at least one embodiment, logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which such code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 601 is internal or external to a processor, for example, or including DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to one or more processors or other hardware logic devices or circuits. In at least one embodiment, code and/or data storage 605 may be cache memory, DRAM, SRAM, non-volatile memory (e.g., flash memory), or other storage. In at least one embodiment, a choice of whether code and/or data storage 605 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be a combined storage structure. In at least one embodiment, code and/or data storage 601 and code and/or data storage 605 may be partially combined and partially separate. In at least one embodiment, any portion of code and/or data storage 601 and code and/or data storage 605 may be included with other on-chip or off-chip data storage, including a processor's L1, L2, or L3 cache or system memory.

In at least one embodiment, logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., flash memory), or other storage. In at least one embodiment, activation storage 620 may be completely or partially within or external to one or more processors or other logical circuits. In at least one embodiment, a choice of whether activation storage 620 is internal or external to a processor, for example, or including DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, logic 615 illustrated in FIG. 6A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, logic 615 illustrated in FIG. 6A may be used in conjunction with central processing unit ("CPU") hardware, graphics processing unit ("GPU") hardware or other hardware, such as field programmable gate arrays ("FPGAs").

Figure 6B:
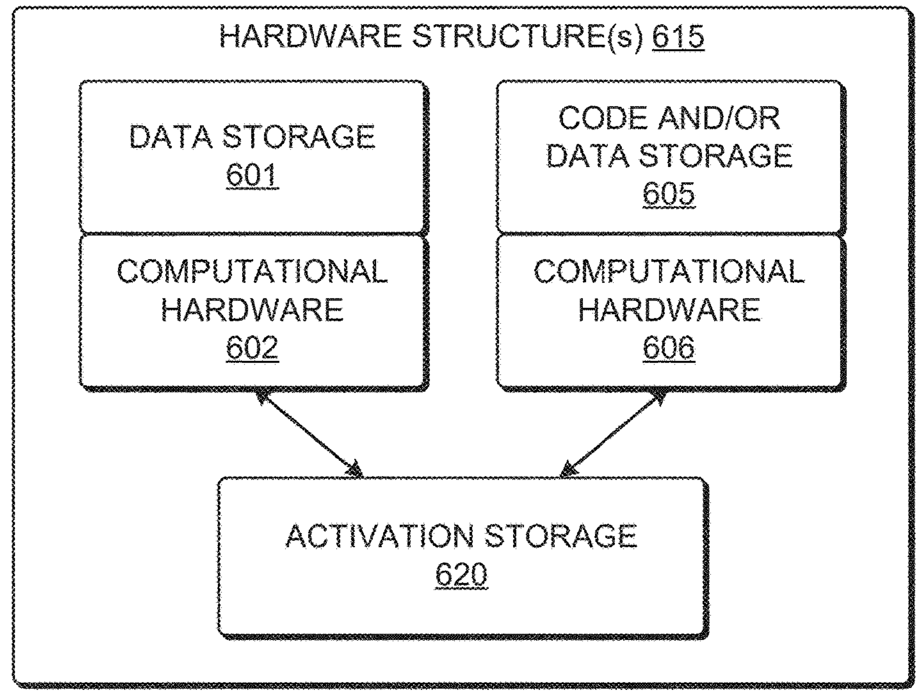
FIG. 6B illustrates logic, according to at least one embodiment.

FIG. 6B illustrates logic 615, according to at least one embodiment. In at least one embodiment, logic 615 is inference and/or training logic. In at least one embodiment, logic 615 may include, without limitation, hardware logic in which computational resources are dedicated or otherwise exclusively used in conjunction with weight values or other information corresponding to one or more layers of neurons within a neural network. In at least one embodiment, logic 615 illustrated in FIG. 6B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, logic 615 illustrated in FIG. 6B may be used in conjunction with central processing unit (CPU) hardware, graphics processing unit (GPU) hardware or other hardware, such as field programmable gate arrays (FPGAs). In at least one embodiment, logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 includes one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one storage/computational pair 601/602 of code and/or data storage 601 and computational hardware 602 is provided as an input to a next storage/computational pair 605/606 of code and/or data storage 605 and computational hardware 606, in order to mirror a conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage/computation pairs 601/602 and 605/606 may be included in logic 615.

In at least one embodiment, at least a portion of the system 100 is implemented using at least a portion of any system(s) depicted in and/or described with respect to FIG. 6. In at least one embodiment, at least a portion of the system 100 is used to implement at least a portion of any system(s) depicted in and/or described with respect to FIG. 6. In at least one embodiment, at least a portion of the method 400 is implemented using at least a portion of any system(s) depicted in and/or described with respect to FIG. 6. In at least one embodiment, at least a portion of the method 400 is used to implement at least a portion of any system(s) depicted in and/or described with respect to FIG. 6. In at least one embodiment, the logic and hardware structures 615 may be implemented by at least one of the AP(s) 104. In at least one embodiment, the logic and hardware structures 615 may be used to implement at least one of the AP(s) 104. In at least one embodiment, at least one of the AP(s) 104 may be implemented as a CPU, DPU, GPU, GPGPUs, PPUs, and/or variations thereof. At least one of the AP(s) 104 generates the CS signal 110 and the clock signal 112 for operation with a peripheral, such as the memory device(s) 106.

Data Center

Figure 7:
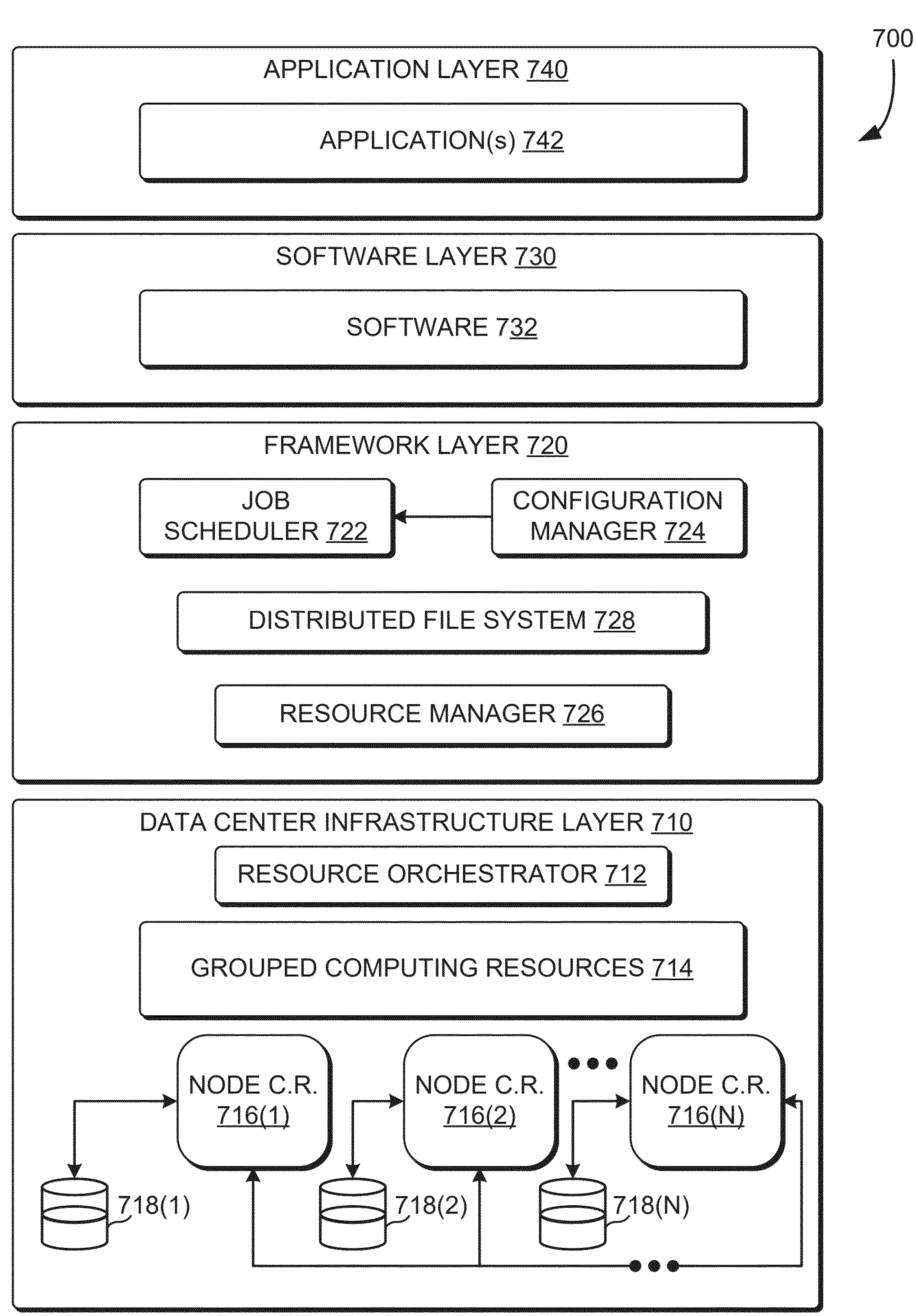
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R. s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software, or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and, a machine learning application, including training or inferencing software, machine learning framework software (e.g., PyTorch, TensorFlow, Caffe, etc.), or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Logic 615 are used to perform inferencing and/or training operations associated with one or more embodiments. Details regarding logic 615 are provided herein in conjunction with FIGS. 6A and/or 6B. In at least one embodiment, logic 615 may be used in data center 700 for inferencing or predicting operations based, at least in part, on weight parameters calculated using neural network training operations, neural network functions and/or architectures, or neural network use cases described herein.

In at least one embodiment, at least a portion of the system 100 is implemented using at least a portion of any system(s) depicted in and/or described with respect to FIG. 7. In at least one embodiment, at least a portion of the system 100 is used to implement at least a portion of any system(s) depicted in and/or described with respect to FIG. 7. In at least one embodiment, at least a portion of the method 400 is implemented using at least a portion of any system(s) depicted in and/or described with respect to FIG. 7. In at least one embodiment, at least a portion of the method 400 is used to implement at least a portion of any system(s) depicted in and/or described with respect to FIG. 7. In the data center 700, the application layer 740 may be implemented by one or more of the AP(s) 104 illustrated in FIG. 1. In at least one embodiment, the application layer 740 may be used to implement one or more of the AP(s) 104 illustrated in FIG. 1. The frequency monitor(s) 108, which may be part of the security component(s) 102 or a standalone circuit, is/are positioned between the AP(s) 104 and the peripheral device, such as the memory device(s) 106. If one of the frequency monitor(s) 108 detects a frequency violation, it will take remedial action, such as resetting the offending AP, resetting the peripheral device (e.g., one of the memory device(s) 106), deasserting the CS signal 110, and/or the like.

In at least one embodiment, the data center infrastructure layer 710 (e.g., the grouped computing resources 714 and/or the node C.R.s 716(1)-716(N)) includes a number of computing devices that may include one or more CPU(s), one or more GPU(s), one or more PPU(s), one or more accelerators, one or more microprocessors, one or more microcontrollers, one or more controllers, one or more DSP(s), one or more DPU(s), one or more other types of processors, one or more virtual machines (e.g., managed by a hypervisor), one or more remote processing units, one or more other types of devices (e.g., one or more communication devices and/or interfaces), two or more heterogenous processing devices, two or more homogenous processing devices, and/or two or more processing devices from multiple manufacturers. In at least one embodiment, the data center infrastructure layer 710 includes components (e.g., one or more routers, one or more switches, one or more gateways, one or more firewalls, etc.) that implement one or more networks (e.g., to enable communication between the grouped computing resources 714 and/or two or more of the node C.R.s 716(1)-716(N)). Any device used to implement the data center infrastructure layer 710 may be used to implement at least one of the AP(s) 104 illustrated in FIG. 1. In at least one embodiment, each of the AP(s) 104 in the data center 700 accesses firmware and/or software such as embodied in the memory device(s) 106.

In at least one embodiment, the security component(s) 102 (e.g., a ROT) are positioned between the AP(s) 104 and one or more other components (e.g., the associated memory device(s) 106, one or more peripheral devices, one or more network interfaces, and/or the like) to provide a layer of protection and prevent unauthorized access to the other component(s). In at least one embodiment, the memory device(s) 106 may be implemented by the memory storage devices 718(1)-718(N). In at least one embodiment, the security component(s) 102 are positioned between the AP(s) 104 (e.g., implemented by the node C.R.s 716(1)-716(N)) and the memory storage devices 718(1)-718(N), respectively, to prevent unauthorized access thereto. Although illustrated in FIG. 1 as a dual channel EROT, the security component(s) 102 can be implemented on a larger scale to include a greater number of integrated frequency monitors (e.g.. each like one of the frequency monitor(s) 108) that provide security protection for a larger number of computing devices, such as the infrastructure layer 710 of the data center 700.

Computer Systems

Figure 8:
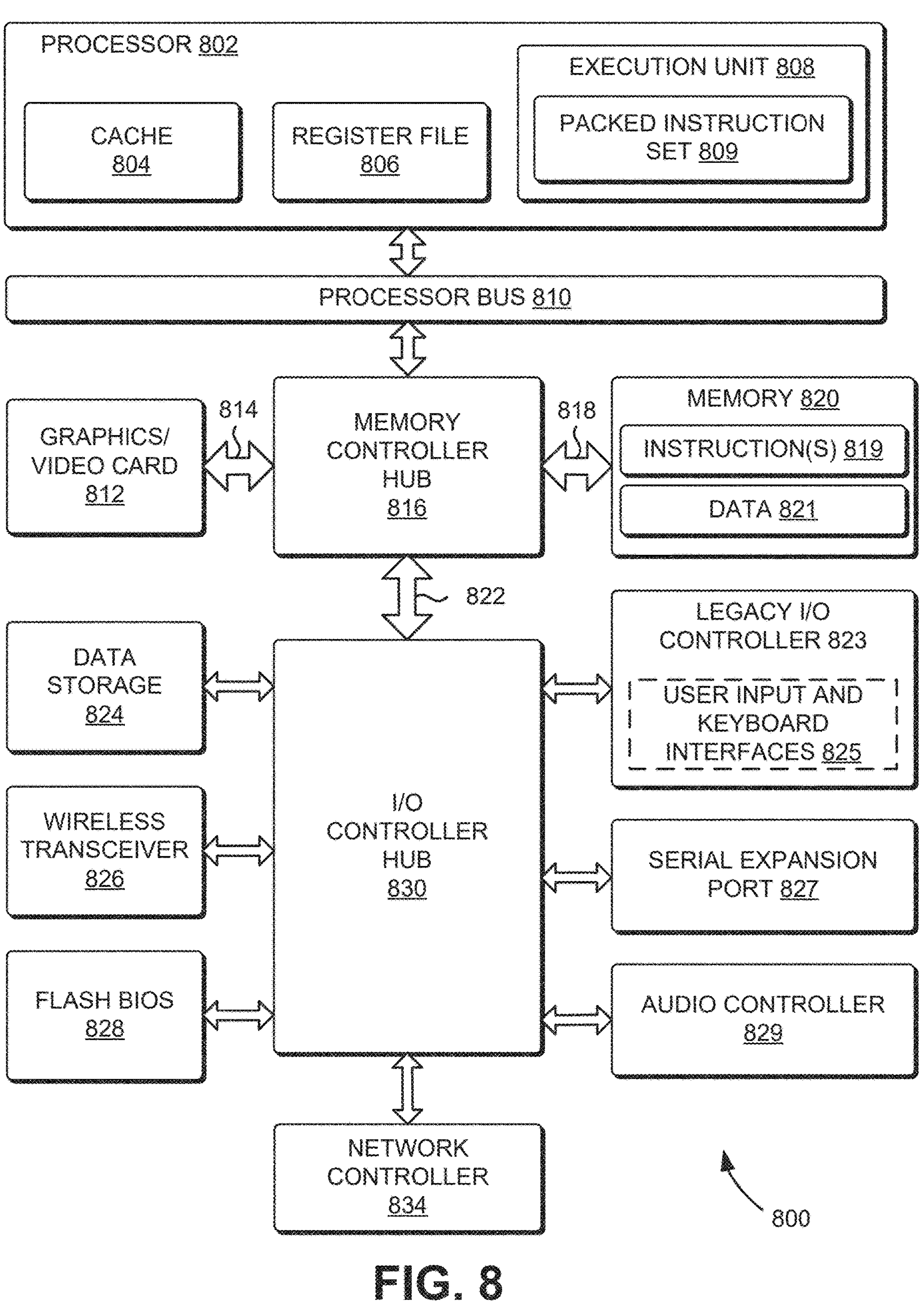
FIG. 8 is a block diagram illustrating a computer system, according to at least one embodiment.

FIG. 8 is a block diagram illustrating an example computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may include a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an example SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Logic 615 are used to perform inferencing and/or training operations associated with one or more embodiments. Details regarding logic 615 are provided herein in conjunction with FIGS. 6A and/or 6B. In at least one embodiment, logic 615 may be used in computer system 800 for inferencing or predicting operations based, at least in part, on weight parameters calculated using neural network training operations, neural network functions and/or architectures, or neural network use cases described herein.

In at least one embodiment, at least a portion of the system 100 is implemented using at least a portion of any system(s) depicted in and/or described with respect to FIG. 8. In at least one embodiment, at least a portion of the system 100 is used to implement at least a portion of any system(s) depicted in and/or described with respect to FIG. 8. In at least one embodiment, at least a portion of the method 400 is implemented using at least a portion of any system(s) depicted in and/or described with respect to FIG. 8. In at least one embodiment, at least a portion of the method 400 is used to implement at least a portion of any system(s) depicted in and/or described with respect to FIG. 8. In at least one embodiment, at least one of the AP(s) 104 of FIG. 1 can be implemented as the processor 802 and/or at least one of the memory device(s) 106 may be part of Flash BIOS 828. In at least one embodiment, at least one of frequency monitor(s) 108 may be implemented as part of the I/O controller hub 830 in FIG. 8. As described above, the frequency monitor(s) 108 monitor(s) the frequency of a clock (e.g., clock signal 112) that provides a clock signal to the Flash BIOS 828.

At least one embodiment of the disclosure can be described in view of the following clauses:

1. A system comprising one or more circuits to detect a selection signal sent to a device by an application processor; and determine, as a result of detecting the selection signal, whether to assert a control signal based on a comparison between a predetermined threshold frequency and a frequency of a clock signal sent by the application processor to the device.
2. The system of clause 1, wherein the one or more circuits are to determine the frequency of the clock signal.
3. The system of clause 1 or 2, wherein the one or more circuits are to determine the frequency of the clock signal by monitoring a first rising edge of the clock signal to a falling edge of the clock signal and monitoring the falling edge to a second rising edge of the clock signal.
4. The system of any one of clauses 1-3, further comprising the device comprising memory, wherein, if asserted, the control signal is to prevent the application processor from accessing the memory.
5. The system of clause 4, wherein the memory is to store at least one of firmware or software that is to be used by the application processor to at least one of perform one or more boot operations, perform one or more device configuration operations, or log data.
6. The system of any one of clauses 1-5, wherein the control signal is to cause the application processor to at least one of reset or restart.
7. The system of any one of clauses 1-6, wherein the device comprises one or more flash memory devices and the control signal is to cause the one or more flash memory devices to reset.
8. The system of any one of clauses 1-7, wherein the device comprises a memory device, a peripheral device, or a network interface.
9. The system of any one of clauses 1-8, further comprising at least one interface over which the application processor is to send the clock signal to the device, the at least one interface comprising at least one of a Serial Peripheral Interface (SPI), an Inter-Integrated Circuit (I2C) interface, an Improved Inter-Integrated Circuit (I3C) interface, or a Low-Speed Input/Output (LSIO) interface.

10. The system of any one of clauses 1-9, wherein the one or more circuits are to restrict access to the device based, at least in part, on signals sent to the device that are monitored by the one or more circuits at a monitoring frequency, and the predetermined threshold frequency is based, at least in part, on the monitoring frequency.

11. The system of clause 10, wherein the one or more circuits comprise a circuit implementing an external root of trust (EROT), and the monitoring frequency is a frequency at which the circuit implementing the EROT is capable of monitoring commands passing therethrough to the device.

12. A root of trust (ROT) circuit comprising one or more circuits to implement a ROT and at least one frequency monitoring circuit, to use the at least one frequency monitoring circuit to monitor a clock signal generated by a processor coupled to the ROT circuit; and to determine whether to assert a control signal based on a comparison between a frequency of the clock signal and a predetermined threshold.

13. The ROT circuit of clause 12, wherein the ROT is an External Root Of Trust (EROT) or an Integrated Root Of Trust (IROT).

14. The ROT circuit of clause 12 or 13, wherein the predetermined threshold is at most a monitoring frequency at which the ROT circuit is capable of monitoring commands passing through the ROT circuit.

15. The ROT circuit of any one of clauses 12-14, wherein the control signal is to cause the processor to reset.

16. The ROT circuit of any one of clauses 12-15, wherein the one or more circuits are to monitor a first rising edge of the clock signal to a falling edge of the clock signal, and to monitor the falling edge to a second rising edge of the clock signal.

17. The ROT circuit of any one of clauses 12-16, wherein the ROT circuit is comprised in at least one of a computer system, an autonomous or semi-autonomous machine, a network device, an edge device within a network, a robot, a data center, a mobile device, an Internet-of-Things device, Global Positioning System (GPS) device, or a network interface.

18. A method comprising monitoring a clock signal provided from a first device to a second device, performing a comparison of a frequency of the clock signal with a predetermined threshold frequency, and determining whether to assert a control signal based on the comparison.

19. The method of clause 18, wherein monitoring the clock signal is performed by a frequency monitoring circuit integrated into a root of trust (ROT) circuit.

20. The method of clause 19, wherein the predetermined threshold frequency is at most a monitoring frequency at which the ROT circuit is capable of monitoring commands passing through the ROT circuit.

21. The method of any one of clauses 18-20, wherein the first device comprises a processor, and the method further comprises causing the processor to reset if the control signal is asserted.

22. The method of any one of clauses 18-21, wherein the second device comprises one or more flash memory devices, and the method further comprises causing at least one of the one or more flash memory devices to reset if the control signal is asserted.

23. A system comprising one or more circuits to: detect a selection signal sent to a device by at least one processor; and determine, as a result of detecting the selection signal, whether to assert a control signal based on a comparison between a threshold frequency and a frequency of a clock signal sent by the at least one processor to the device.

24. The system of clause 23, wherein the one or more circuits are to determine the frequency of the clock signal.

25. The system of clause 23 or 24, wherein the one or more circuits are to determine the frequency of the clock signal by monitoring a first rising edge of the clock signal to a falling edge of the clock signal and monitoring the falling edge to a second rising edge of the clock signal.

26. The system of any one of clauses 23-25, wherein the device is to comprise memory, and, if asserted, the control signal is to prevent the at least one processor from accessing the memory.

27. The system of clause 26, wherein the memory is to store at least one of firmware or software that is to be used by the at least one processor to at least one of perform one or more boot operations, perform one or more device configuration operations, or log data.

28. The system of any one of clauses 23-27, wherein the control signal is to cause the at least one processor to at least one of reset or restart.

29. The system of any one of clauses 23-28, wherein the device is to comprise one or more flash memory devices and the control signal is to cause the one or more flash memory devices to reset.

30. The system of any one of clauses 23-29, wherein the device is to comprise a memory device, a peripheral device, or a network interface.

31. The system of any one of clauses 23-30, further comprising: at least one interface over which the at least one processor is to send the clock signal to the device, the at least one interface comprising at least one of a Serial Peripheral Interface (SPI), an Inter-Integrated Circuit (I2C) interface, an Improved Inter-Integrated Circuit (I3C) interface, or a Low-Speed Input/Output (LSIO) interface.

32. The system of any one of clauses 23-31, wherein the one or more circuits are to restrict access to the device based, at least in part, on signals sent to the device that are monitored by the one or more circuits at a monitoring frequency, and the threshold frequency is based, at least in part, on the monitoring frequency.

33. The system of clause 32, wherein the one or more circuits are to comprise a circuit implementing an external root of trust (EROT), and the monitoring frequency is a frequency at which the circuit implementing the EROT is capable of monitoring commands passing therethrough to the device.

34. The system of any one of clauses 23-33, wherein the at least one processor is to comprise at least one of one or more central processing units (CPU(s)), one or more graphics processing units (GPU(s)), one or more parallel processing units (PPU(s)), one or more accelerators, one or more microprocessors, one or more microcontrollers, one or more controllers, one or more digital signal processors, one or more data processing units (DPU(s)), one or more virtual machines, one or more communication devices, one or more communication interfaces, two or more heterogenous processing devices, two or more homogenous processing devices, or two or more processing devices from multiple manufacturers.

35. A system comprising: a processor to send a selection signal and a clock signal to a device; and one or more circuits to: detect the selection signal sent to the device by the processor; and determine, as a result of detecting the selection signal, whether to assert a control signal based on a comparison between a predetermined threshold frequency and a frequency of the clock signal sent by the processor to the device.

36. The system of clause 35, wherein the processor comprises at least one of a central processing unit (CPU), a graphics processing unit (GPU), a parallel processing unit (PPU), an accelerator, a microprocessor, a microcontroller, a controller, a digital signal processor, a data processing unit (DPU), a virtual machine, a remote processing unit a communication device, or a communication interface.

37. A data center comprising a plurality of processors to generate a selection signal and a clock signal for a respective device associated with each of the plurality of processors, one or more circuits to detect the selection signal sent to the respective device by the each of the plurality of processors, and determine, as a result of detecting the selection signal, whether to assert a control signal based on a comparison between a predetermined threshold frequency and a frequency of the clock signal sent by each of the plurality of processors to the respective device.

38. The data center of clause 37, wherein the plurality of processors comprises at least one of one or more central processing units (CPU(s)), one or more graphics processing units (GPU(s)), one or more parallel processing units (PPU(s)), one or more accelerators, one or more microprocessors, one or more microcontrollers, one or more controllers, one or more digital signal processors, one or more data processing units (DPU(s)), one or more virtual machines, one or more remote processing units, one or more communication devices, one or more communication interfaces, two or more heterogenous processing devices, two or more homogenous processing devices, or two or more processing devices from multiple manufacturers.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory and/or secondary storage such as those described herein. Computer programs, if executed by one or more processors, enable at least one system described herein to perform various functions in accordance with at least one embodiment. In at least one embodiment, memory, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of a CPU such as those described herein, a parallel processing system such as those described herein, an integrated circuit capable of at least a portion of capabilities of both the CPU, the parallel processing system, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, a computer system described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic. In at least one embodiment, a computer system includes or refers to any devices illustrated in any of the drawings and/or described herein.

In at least one embodiment, a parallel processing system includes, without limitation, a plurality of parallel processing units ("PPUs") and associated memories. In at least one embodiment, PPUs are connected to a host processor or other peripheral devices via an interconnect and a switch or multiplexer. In at least one embodiment, a parallel processing system distributes computational tasks across the PPUs, which can be parallelizable—for example, as part of distribution of computational tasks across multiple graphics processing unit ("GPU") thread blocks. In at least one embodiment, memory is shared and accessible (e.g., for read and/or write access) across some or all of the PPUs, although such shared memory may incur performance penalties relative to use of local memory and registers resident to a PPU. In at least one embodiment, operation of the PPUs is synchronized through use of a command such as __syncthreads( ), wherein all threads in a block (e.g., executed across multiple PPUs) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation includes generating one or more machine-executable instructions, operations, or other signals from source code. In at least one embodiment, an API compiled into one or more instructions, operations, or other signals, when performed, causes one or more processors, such as graphics processors, graphics cores, parallel processor, a CPU, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or example language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as example forms of implementing the claims.

What is claimed is:

1. A system comprising:

one or more circuits to:

detect a selection signal sent to a device by an application processor over at least one communication channel connecting the device to the application processor, the application processor being separate from the device; and as a result of detecting the selection signal, assert a control signal based on a comparison between a predetermined threshold frequency and a frequency of a clock signal sent by the application processor to the device over the at least one communication channel, the control signal to cause access to the device to be restricted, the clock signal to be usable by the application processor to synchronize data transmission with the device over the at least one communication channel.

2. The system of claim 1, wherein the one or more circuits are to determine the frequency of the clock signal.

3. The system of claim 1, wherein the one or more circuits are to determine the frequency of the clock signal by monitoring a first rising edge of the clock signal to a falling edge of the clock signal and monitoring the falling edge to a second rising edge of the clock signal.

4. The system of claim 1, wherein the device is to comprise memory, and causing the access to the device to be restricted comprises the control signal causing the application processor to be prevented from accessing the memory.

5. The system of claim 4, wherein the memory is to store at least one of firmware or software that is to be used by the application processor to at least one of perform one or more boot operations, perform one or more device configuration operations, or log data.

6. The system of claim 1, wherein causing the access to the device to be restricted comprises the control signal causing the application processor to at least one of reset or restart.

7. The system of claim 1, wherein the device comprises one or more flash memory devices and causing the access to the device to be restricted comprises the control signal causing the one or more flash memory devices to reset.

8. The system of claim 1, wherein the device comprises a memory device, a peripheral device, or a network interface.

9. The system of claim 1, further comprising:

at least one interface over which the application processor is to send the clock signal to the device, the at least one interface comprising at least one of a Serial Peripheral Interface (SPI), an Inter-Integrated Circuit (I2C) interface, an Improved Inter-Integrated Circuit (I3C) interface, or a Low-Speed Input/Output (LSIO) interface.

10. The system of claim 1, wherein a first portion of the one or more circuits is to determine the frequency of the clock signal, a second portion of the one or more circuits is operable to monitor signals sent to the device at a monitoring frequency, and the predetermined threshold frequency is based, at least in part, on the monitoring frequency.

11. The system of claim 1, wherein the one or more circuits comprise a circuit implementing an external root of trust (EROT) capable of monitoring commands passing therethrough to the device at a monitoring frequency, and the predetermined threshold frequency is based, at least in part, on the monitoring frequency.

12. A root of trust (ROT) circuit comprising:

one or more circuits to:

implement a ROT and at least one frequency monitoring circuit;

use the at least one frequency monitoring circuit to monitor a clock signal sent by a processor to a separate device over at least one communication channel, the clock signal to be usable by the processor to synchronize communication with the separate device over the at least one communication channel; and assert a control signal based on a comparison between a frequency of the clock signal and a predetermined threshold, the control signal to cause access to the separate device to be restricted.

13. The ROT circuit of claim 12, wherein the ROT is an External Root Of Trust (EROT) or an Integrated Root Of Trust (IROT).

14. The ROT circuit of claim 12, wherein the predetermined threshold is at most a monitoring frequency at which the ROT circuit is capable of monitoring commands passing through the ROT circuit.

15. The ROT circuit of claim 12, wherein causing the access to the separate device to be restricted comprises the control signal causing the processor to reset to prevent the processor from accessing the separate device.

16. The ROT circuit of claim 12, wherein the one or more circuits are to monitor a first rising edge of the clock signal to a falling edge of the clock signal, and to monitor the falling edge to a second rising edge of the clock signal.

17. The ROT circuit of claim 12, wherein the ROT circuit is comprised in at least one of:

a computer system;
an autonomous or semi-autonomous machine;
a network device;
an edge device within a network;
a robot;
a data center;
a mobile device;
an Internet-of-Things device;
Global Positioning System (GPS) device; or
a network interface.

18. A method comprising:

monitoring a clock signal sent from a first device to a different second device to synchronize communication between the first device and the different second device over at least one communication channel;

performing a comparison of a frequency of the clock signal with a predetermined threshold frequency; and asserting a control signal based on the comparison, the control signal to cause communication between the first device and the different second device to be restricted.

19. The method of claim 18, wherein monitoring the clock signal is performed by a frequency monitoring circuit integrated into a root of trust (ROT) circuit.

20. The method of claim 19, wherein the predetermined threshold frequency is at most a monitoring frequency at which the ROT circuit is capable of monitoring commands passing through the ROT circuit.

21. The method of claim 18, wherein the first device comprises a processor, and causing the communication between the first device and the different second device to be restricted comprises causing the processor to reset.

22. The method of claim 18, wherein the different second device comprises one or more flash memory devices, and causing the communication between the first device and the different second device to be restricted comprises causing at least one of the one or more flash memory devices to reset.

23. The method of claim 18, wherein causing the communication between the first device and the different second device to be restricted comprises:

limiting the clock signal based at least in part on the predetermined threshold frequency.

24. The system of claim 1, wherein causing the access to the device to be restricted comprises:

the control signal indicating a frequency violation, and in response to indication of the frequency violation, the one or more circuits to are to limit the clock signal based at least in part on the predetermined threshold frequency.

25. The ROT circuit of claim 12, wherein causing the access to the separate device to be restricted comprises:

the control signal indicating a frequency violation, and in response to indication of the frequency violation, the one or more circuits to are to gate the clock signal.

* * * * *